United States Patent
Saydyk et al.

(10) Patent No.: US 9,761,994 B2
(45) Date of Patent: Sep. 12, 2017

(54) SOURCE ENERGY CONNECTOR PIGTAIL

(71) Applicant: Teledyne Instruments, Inc., Thousand Oaks, CA (US)

(72) Inventors: Daniel Saydyk, Kingwood, TX (US); Michael Williams, Cypress, TX (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 15/060,417

(22) Filed: Mar. 3, 2016

(65) Prior Publication Data

US 2016/0261064 A1    Sep. 8, 2016

Related U.S. Application Data

(60) Provisional application No. 62/127,758, filed on Mar. 3, 2015.

(51) Int. Cl.
 *H01R 13/58* (2006.01)
 *G01V 1/04* (2006.01)
 *H01R 13/523* (2006.01)

(52) U.S. Cl.
 CPC ........ *H01R 13/5845* (2013.01); *G01V 1/04* (2013.01); *H01R 13/523* (2013.01); *H01R 2201/14* (2013.01)

(58) Field of Classification Search
 CPC .......... H01R 13/5845; H01R 13/6275; H01R 13/5808; H01R 13/523; H01R 2201/14; G01V 1/04; A61B 5/14552; F02M 51/0664; F02M 51/0671
 USPC ........................................ 439/449
 See application file for complete search history.

(56) References Cited

U.S. PATENT DOCUMENTS

| | | | |
|---|---|---|---|
| 3,816,641 A | 6/1974 | Iversen | |
| 5,119,457 A | 6/1992 | Callahan | |
| 5,120,268 A | 6/1992 | Gerrans | |
| 5,885,108 A | 3/1999 | Gerrans | |
| 5,984,714 A | 11/1999 | Gerrans | |
| 6,390,393 B1 * | 5/2002 | Bulgatz | F02M 51/0671 239/533.12 |
| 6,601,785 B2 * | 8/2003 | Bulgatz | F02M 51/0671 239/533.2 |
| 6,920,690 B1 * | 7/2005 | Imoehl | F02M 51/0671 29/888.44 |
| 7,458,530 B2 * | 12/2008 | Morton | F02M 51/0664 239/585.5 |
| 7,497,738 B2 * | 3/2009 | Kuo | H01R 29/00 439/638 |
| 8,118,620 B2 * | 2/2012 | Al-Ali | H01R 13/6275 439/607.27 |
| 8,315,683 B2 * | 11/2012 | Al-Ali | A61B 5/14552 600/310 |
| 8,357,007 B2 * | 1/2013 | Ihde | H01R 13/5808 439/455 |
| 8,540,532 B2 | 9/2013 | Barnard et al. | |

(Continued)

*Primary Examiner* — Jean F Duverne
(74) *Attorney, Agent, or Firm* — Duncan Galloway Egan Greenwald, PLLC; Kevin T. Duncan (57) ABSTRACT

The present invention provides a ruggedized heavy duty source connector adapted for use on large air guns. The source connector comprises reinforcing fibers in the cable jacket that are anchored to the connector front shell, an external blast shield in place of a rear shell, and a fatigue resistant strain relief overmold.

23 Claims, 6 Drawing Sheets

(56) References Cited

U.S. PATENT DOCUMENTS 8,777,662 B2 7/2014 Barnard et al.
2003/0224661 A1 12/2003 Dye

* cited by examiner

SOURCE ENERGY CONNECTOR PIGTAIL

CROSS-REFERENCE TO RELATED APPLICATION

The present invention claims priority to the U.S. Provisional Patent Application No. 62/127,758 entitled SOURCE ENERGY CONNECTOR PIGTAIL, (Saydyk et al.) filed Mar. 3, 2015, which is incorporated by reference herein in its entirety.

FIELD OF INVENTION

This invention generally relates to connector cables which can connect a subsea assembly or apparatus with a source vessel or surface source.

BACKGROUND OF THE INVENTION

Underwater electrical cables and marine conductors in general cause major problems when they begin to leak. In some instances leakage is common due to the fact that such cables, and their connectors, commonly operate in subsurface environments, or in near surface atmospheric environments characterized by extreme salt and humidity, wave action, tugging and bending due to ships, boats or other vehicles and exposure to varying weather and environments. The primary sealing means in underwater connectors is generally the insulation encapsulating the strands of individual conductors, or it is an encapsulating material, such as plastic, around the housing of the connector constructed of stainless steel, plastic, high tech plastic or any alloy used for the connector. Frequently, these connectors are made of corrosion resistant metals, such as stainless steel, or the like, and are coated with a plastic or other resistant coating for the purpose of precluding entry of moisture.

Further, in marine seismic operations, underwater electrical plugs or connectors are needed to connect power and instrumentation conductors to other equipment, such as seismic sound generators, i.e. air guns. These "guns" are used as a sound source to obtain acoustic reflections from the sea-floor. Typically, they are fired every ten to fifteen seconds producing extremely strong pressure waves. As a result, the electrical, cables, conductors, and connectors are subjected to a great deal of structural abuse, and normally do not last for extended periods of time before developing leaks or other operational defects. Typically, these components, such as electrical connectors, are exposed to such blasting forces and also to the extremely adverse nature of the environment and will not last long if they are not able to withstand environmental and operational conditions. Therefore, all of the electrical connectors and other components used in these harshest of environments must necessarily withstand repeated explosive forces on their exteriors while allowing for a degree of flexibility within lest the internal conductor be jolted loose from its external housing.

Underwater electrical cables are also subject to movement due to currents, wave action, and the general movement of their fluid environment, which can cause the electrical cables to move in any variety of directions and to be tugged and yanked by the motion of the water. Underwater equipment is frequently connected to instruments on the surface, often to floating rigs on the surface of the water. The motion of the floating rig in relation to the underwater equipment produces great stress on the underwater electrical cable particularly at the cable connection to the underwater equipment. In particular, the connectors endure severe tugging and bending due to movement of the vessel or ship and due to the energy emitted by the guns.

Generally underwater marine connectors are provided with a reinforced tail, which is a sheath of reinforcement around the cable insulation from the electrical connection to some point along the insulated electrical conducting cable to prevent excessive bending at the point where the rigid connector and the conductor are connected. This connector tail of reinforced insulating material protects the electrical cable from excessive bending, at the point where the conductor connects to the connector portion, which might crack the insulating material, exposing the electrical conductor to the water and creating a short of the electrical current. Electrical cables are particularly susceptible to such excessive bending near the point of connection between the electrical cable and the underwater equipment because the equipment fixes the one end of the cable in place, allowing no mobility of the cable to relieve bending stresses on the cable.

Prior tails suffer from a bending focal point at the junction of the tail and the main conductor cable. This is because the prior tails form a substantially rigid and extended reinforced section at the connection between the connector and the cable, thereby moving the bending point from the connection at the connector and cable to the end of the reinforced tail and the more limber and flexible cable. In such an instance, the tail itself, rather than protecting the cable from leakage, can become a source of resistance on the cable and increase the chances that the cable will split and leak at the focal point.

Some of the issues with the prior art have been addressed by U.S. Pat. No. 5,984,714 entitled ELECTRICAL CONNECTOR TAIL, issued Nov. 16, 1999 (Gerrans I), and U.S. Pat. No. 5,885,108, entitled ELECTRICAL CONNECTOR, issued Mar. 23, 1999 (Gerrans both of which are incorporated by reference herein in their entirety. In the Gerrans patents, the bending focal point is moved from the end or terminus of the tail, where the tail and cable meet to a point on the tail itself where the tail provides additional strength to the insulated conductors. This movement of the bending point is achieved by providing a reduced cross-sectional portion or neck portion in the tail. Because this neck portion is close to the connector end and conductor connection the bending occurs at the neck of the tail as opposed to at the terminus of the tail where the insulated conductor provides little strength.

The problem of conductor cable leakage or breakage of the conductor at the junction of the cable and the connector tail is not limited to underwater or marine environments, but is also a problem in any situation where excessive bending of an electrical conductor threatens to compromise the integrity of the electrical circuit.

The problem has been exacerbated by the industry trend towards larger and more powerful air guns. As air guns get larger and more powerful, the forces experienced by the source connector increase and the life of the source connector decreases. Known source connectors experience failures after 15,000 to 25,000 shots of the air gun. Failure after 15,000 to 25,000 shots equates to 1.7 to 2.8 days of continuous service. This service life requires frequent repair or replacement of source connectors that results in unwanted downtime. The short service life also requires that the source connectors be replaced in a reactionary manner, replacing the source connectors only after a failure has been detected.

Thus, what is needed is a source connector with an increase in service life even when used with larger and more powerful air guns.

SUMMARY OF THE INVENTION

The present invention provides an in-water source connector cable for coupling the timing hardware and software on a source boat to an air gun seismic source. The present invention provides a ruggedized source connector adapted to be used with large air guns, e.g., air guns 300 in$^3$ and larger and for extending service life on air guns 300 in$^3$ and smaller.

The source connector of the present invention utilizes a ruggedized design that increases the durability at the primary points of failure in the prior designs. The reinforcements of the present invention comprise reinforcing synthetic fiber in the cable jacket, anchoring of the synthetic fiber to the connector front shell, improved wire fatigue resistance, removal of known stress concentrations, and a fatigue resistant strain relief overmold. Additionally, an external blast shield covers the back shell-to-overmold transition, creating a protective exoskeleton and eliminating the stress concentration at the transition.

The additional reinforcements of the present invention result in a service life for the source connector in excess of 140,000 air gun shots. This service life equates to more than 16.2 days of continuous operation. The extended service life provided by the present invention enables the source connector to be replaced on a predicable preventative maintenance schedule rather than in a reactionary manner.

In a first embodiment the present invention provides a ruggedized source connector cable comprising: a body having a front, a back, an interior and an exterior; an overmold assembly disposed at the back in the interior of the body; a shell disposed about the exterior of the back of the body and covering at least a portion of the overmold assembly; a set of pins disposed in the interior at the front of the body; and a cable disposed within the overmold assembly and operatively connected to the set of pins.

The source connector of the above embodiment may further comprise wherein the shell is a blast shield. The overmold assembly may comprise a shell-to-overmold transition and a tapered tail adapted to provide strain relief to the cable. The strain relief may be provided by a plurality of reinforcement layers. The reinforcement layers may comprise layers of aramid fiber reinforcement. The overmold assembly may comprise a engineered polymer overmold. A set of o-rings may be disposed at the front of the body and may be adapted to provide a hermetic seal when the source connector is in a mated configuration. The shell may be joined with the body by a threaded portion. The cable may be potted in a socket within the interior of the body of the source connector. The potting may be an epoxy potting and the socket is a spelter socket. The set of pins may comprise a set of pins disposed in a retained insert at the front of the body.

In another embodiment, the present invention provides a system for providing an electrical connection to a piece of subsea equipment requiring a strain and pressure-resistant connection, the system comprising: an electrical power source; the piece of subsea equipment comprising a set of receptacles; a ruggedized source connector cable comprising: a body having a front, a back, an interior and an exterior; an overmold assembly disposed at the back in the interior of the body; a shell disposed about the exterior of the back of the body and covering at least a portion of the overmold assembly; a set of pins disposed in the interior at the front of the body; and a cable disposed within the overmold assembly and operatively connected to the set of pins; wherein the piece of subsea equipment is connected to the electrical power source by the ruggedized source connector cable mated to a receptacle in the set of receptacles.

The system of the above embodiment may further comprise wherein the piece of subsea equipment is an air gun. The system may further comprise wherein the shell of the source connector comprises a blast shield. The system may further comprise wherein the overmold assembly of the source connector comprises a shell-to-overmold transition and a tapered tail adapted to provide strain relief to the cable. The system may further comprise wherein the strain relief is provided by a plurality of reinforcement layers. The system may further comprise wherein the reinforcement layers comprise layers of aramid fiber reinforcement. The system may further comprise wherein the overmold assembly of the source connector comprises a engineered polymer overmold. The system may further comprise wherein a set of o-rings are disposed at the front of the body of the source connector and are adapted to provide a hermetic seal when the source connector is mated with the receptacle. The system may further comprise wherein the shell of the source connector is joined with the body by a threaded portion. The system may further comprise wherein the cable is potted in a socket within the interior of the body of the source connector. The system may further comprise wherein the potting is an epoxy potting and the socket is a spelter socket. The system may further comprise wherein the set of pins in the source connector comprise a set of pins disposed in a retained insert at the front of the body.

In yet another embodiment, the present invention provides a system for providing an electrical connection to a piece of subsea equipment requiring a strain and pressure-resistant connection, the system comprising: an electrical power source; the piece of subsea equipment comprising a set of receptacles; a ruggedized source connector cable having a first source connector and a second source connector, each of the first source connector and the second source connector comprising: a body having a front, a back, an interior and an exterior; an overmold assembly disposed at the back in the interior of the body; a shell disposed about the exterior of the back of the body and covering at least a portion of the overmold assembly; a set of pins disposed in the interior at the front of the body; and a cable disposed within the overmold assembly and operatively connected to the set of pins; wherein the piece of subsea equipment is connected to the electrical power source by the first source connector of the ruggedized source connector cable mated to a receptacle in the set of receptacles and the second source connector of the ruggedized source connector cable in an operative electrical connection with the electrical power source.

In another embodiment, the present invention provides a ruggedized source connector comprising: a body having a front, a back, an interior and an exterior; an overmold assembly disposed in part at the back and in the interior of the body; a shell mechanically coupled to the body and disposed about the exterior of the back of the body and covering at least a portion of the overmold assembly; a set of pins disposed in the interior at the front of the body; and a cable disposed within the overmold assembly and having a set of conductors electrically connected to the set of pins.

In another embodiment, the present invention provides a system for providing an electrical connection to a piece of subsea equipment requiring a strain and pressure-resistant connection, the system comprising: an electrical power source; the piece of subsea equipment comprising a set of receptacles; a ruggedized source connector cable having a first source connector and a second source connector, each of the first source connector and the second source connector comprising: a body having a front, a back, an interior and an exterior; an overmold assembly disposed in part at the back and in the interior of the body; a shell mechanically coupled to the body and disposed about the exterior of the back of the body and covering at least a portion of the overmold assembly; a set of pins disposed in the interior at the front of the body; and a cable disposed within the overmold assembly and having a set of conductors electrically connected to the set of pins; wherein the piece of subsea equipment is connected to the electrical power source by the first source connector of the ruggedized source connector cable mated to a receptacle in the set of receptacles and the second source connector of the ruggedized source connector cable in an operative electrical connection with the electrical power source.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1A:
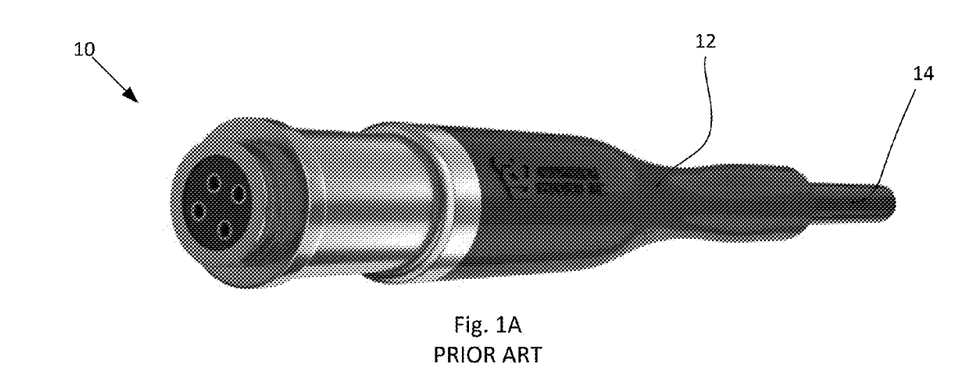
FIG. 1A provides a perspective view of a prior art source connector.
Figure 1B:
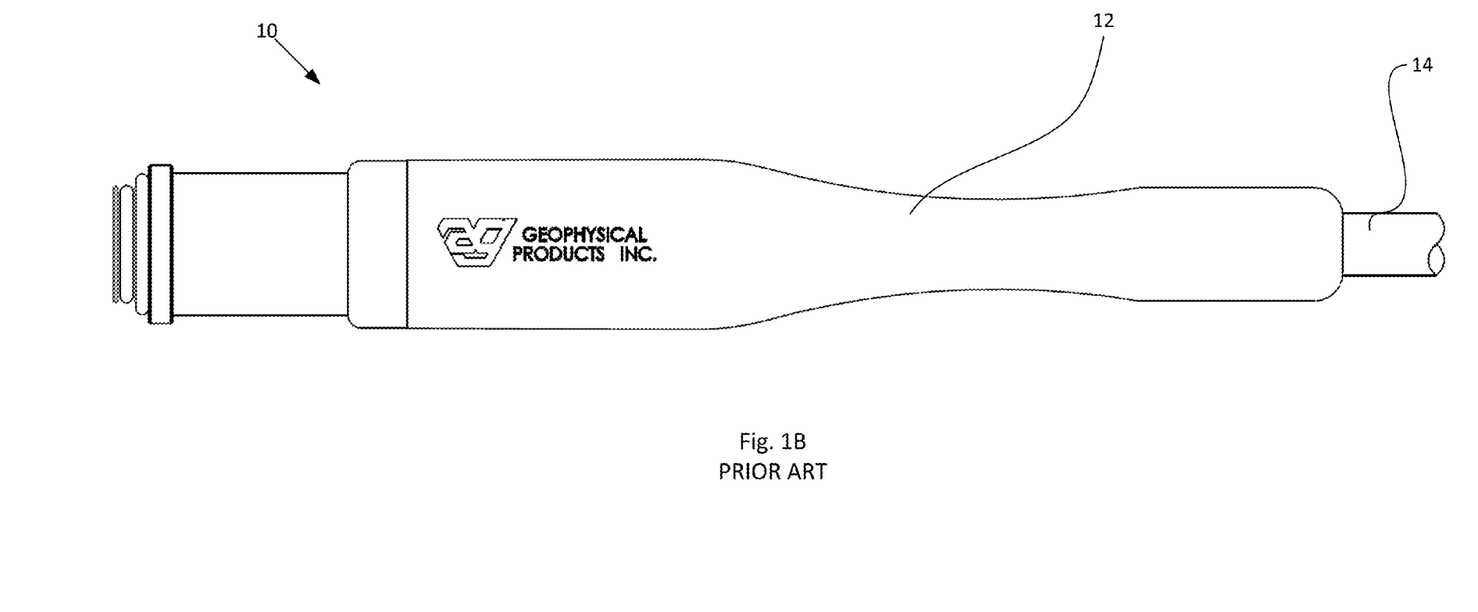
FIG. 1B provides a plan view of a prior art source connector.

With reference to FIGS. 1A and 1B, a prior art source connector 10 is shown. Source connector 10 comprises a neck or tail 12 having a reduced cross-section and being closer to the front of the source connector 10. The tail 12 of the source connector and cable 14 of the source connector 10 are both joined by a urethane overmold. The overmold of the prior art connector 10 is prone to failure at the shell-to-overmold transition in the tail 12 and at the overmold-to-cable transition 14.

Figures 2A, 2B:
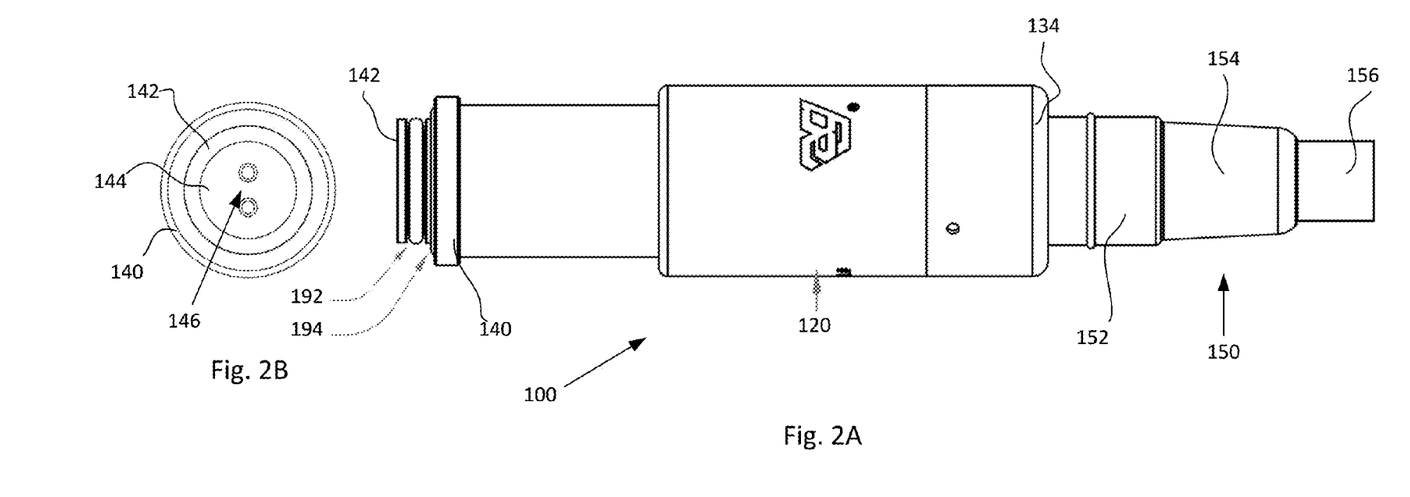
FIG. 2A provides a side plan view of a source connector according to the present invention.
FIG. 2B provides a front view of a two-pin configuration of a source connector according to the present invention.
Figure 4:
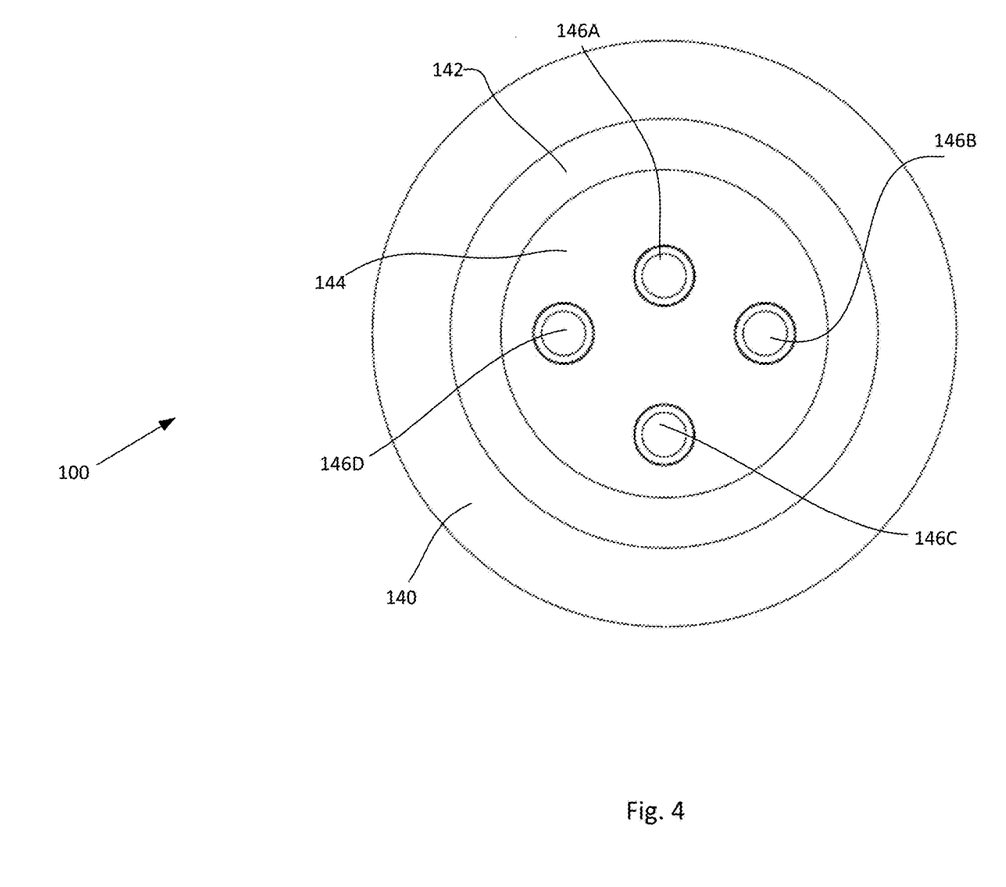
FIG. 4 provides a front view of a four-pin configuration of a source connector according to the present invention.

With reference to FIGS. 2A and 2B, a source connector 100 according to the present invention is provided. The source connector 100 comprises connector body 120, overmold assembly 150, and cable 156. The face 144 of the connector 100 may comprise a set of pins 146. The set of pins 146 may comprise two pins as shown in FIG. 2B, four pins as shown in FIG. 4, or another suitable number of pins. The face 144 and pins 146 may be part of a retained insert 202 shown in FIG. 2 that may be pressed in or molded in place. The face 144 is disposed within the front rim 142. A set of o-rings 192 and 194 seal the face 144 and pins 146 from the harsh exterior environment when the connector 100 is in a mated condition. The collar 140 abuts the receptacle for the connector 100 and provides support for the connector 100 at the point of mating between the connector 100 and receptacle. The connector body 120 and the shell 134 comprise the protective shell for the connector 100. The shell 134 acts as a blast shield to protect the overmold assembly 150. The overmold assembly 150 comprises the connector tail 152 which may be molded into the interior of the body 120. The tapered portion 154 of the connector tail 152 protects and reinforces the overmold-to-cable transition over the cable 156.

Figure 3:
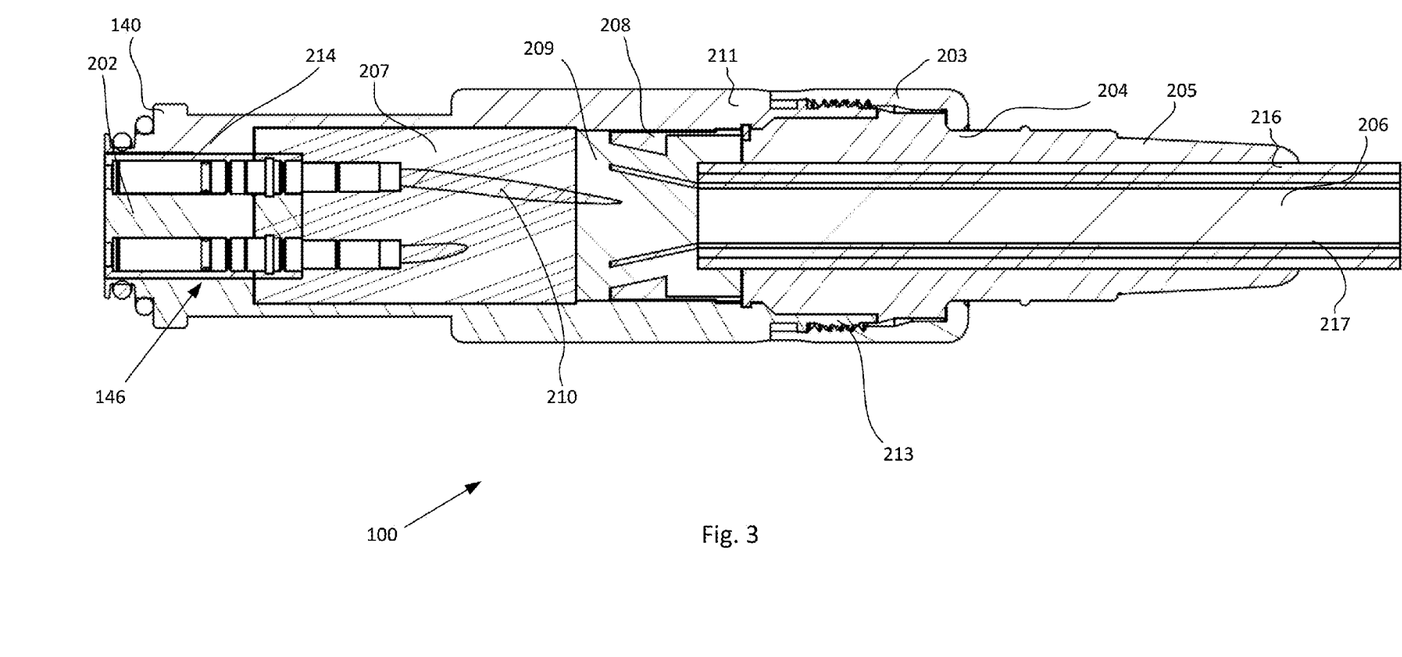
FIG. 3 provides a cross-sectional view of a source connector according to the present invention.

With reference now to FIG. 3, a cross-section view of the source connector 100 is provided. The retained insert 202, which may be a press-in insert, disposed within the front 214 of the source connector 100 may comprise a set of pins 146, shown in FIGS. 2A and 2B. The interior 207 of the connector 100 may be filled with a form of water block potting to insulate the connection and keep out the harsh exterior environment. The body 211 and shell 203, which acts as an external blast shield, create a protective exoskeleton around the shell-to-overmold transition 204 and the shell 203 may be joined to the metal connector body 211 by a threaded portion 213. The shell-to-overmold transition 204 is molded into the connector body 211. The tail 205 and shell-to-overmold transition 204 may comprise an engineered polymer strain relief overmold, which may be a polyurethane strain relief overmold. The cable 206 comprises a multi-conductor cable of wire rope lay construction, e.g., a four conductor 16 American Wire Gauge (AWG) cable. A cable breakout 210 joins the set of pins 146 to the cable 206. The cable 206 may have multiple layers of aramid fiber reinforcement or any other suitable reinforcing material such as a reinforcing synthetic fiber, e.g. Vectran® reinforcement may be used. Vectran® is a trademark owned by Kuraray, Co. Ltd. Corporation. The aramid fiber reinforcement may comprise an inner layer 217 and an outer layer 216 that are braided to reduce the torsional loads on the cable 206. Intermediate layers of axial or braided construction may be added to provide further support.

All layers including the inner 217 and outer 216 layers may be anchored into the spelter socket 209 with a mechanical binding anchor such as a conical insert or a high strength epoxy potting 208. The arrangement of the inner 217 and outer 216 layers transfers the axial and torsional loads from the air gun discharge into the metal body 211, minimizing the stress on the engineered polymer strain relief overmold 204. The wire bundles that comprise the cable 206 may be in a balanced wire rope lay configuration, such as a 7×7/32 stranding configuration, with each bundle having core supports. This stranding configuration of the wire bundles of cable 206 improves the fatigue resistance of the wire conductors. The surface area of the strain relief tail 205 is significantly reduced from that of the prior art tail 12 shown in FIGS. 1A and 1B. The smaller profile of the tail 205 presents a smaller profile to the collapsing air gun bubble. The smaller profile results in a smaller force transfer to the overmold 204 and tail 205.

The configuration of the cable 206, aramid fiber layers including inner layer 217 and outer layer 216, overmold 204, and tail 205 significantly reduce the chance of a fatigue break at the overmold-to-cable transition compared to prior art designs. Specifically, the overmold 204 and tail 205 provide a smaller cross-section and a tapered strain relief support and are protected by the shell 203. The shape, composition, and position of the overmold 204 and tail 205 reduce strain on the cable 206 and improve the durability of the source connector 100. Additionally, the potting 208 secures the cable 206 within the socket 209 and reduces the likelihood of the cable 206 becoming dislodged or losing electrical connection during operation. The overall length of the source connector 100 is reduced from that of the prior art. The reduced overall length of the source connector 100 reduces the distance the connector 100 protrudes from the back of the air gun, thereby reducing the risk of damage to the connector 100 during deployment and retrieval of the air gun.

Figure 3A:
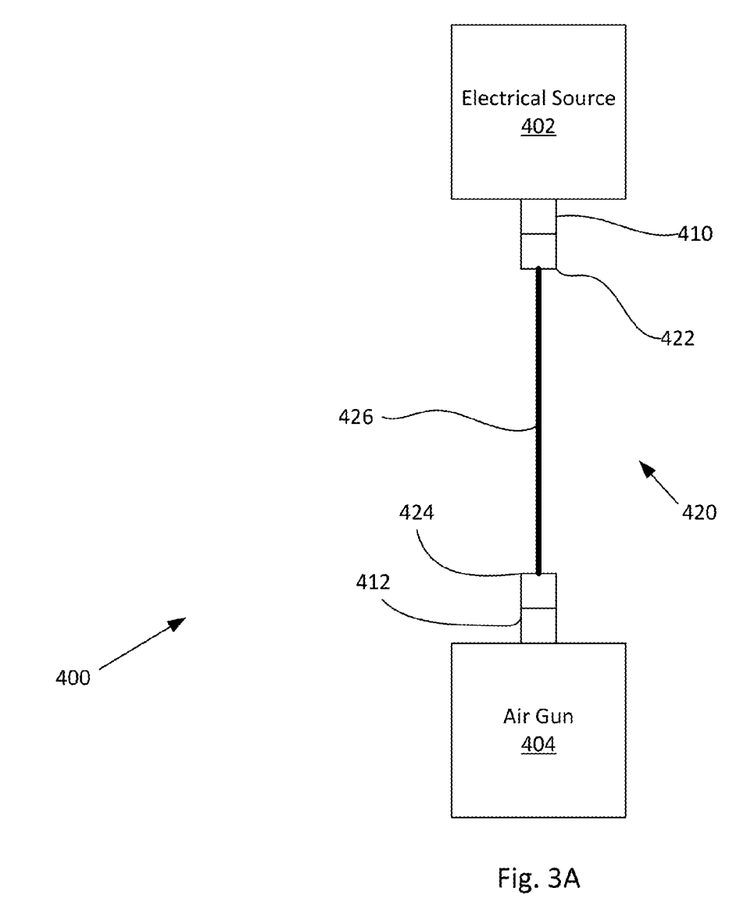
FIG. 3A provides a block diagram of a system comprising an electrical source and an air gun joined by the source connector of the present invention.

With reference now to FIG. 3A, a block diagram of a system 400 comprising an electrical source device 402 joined to a subsea device 404 is provided. The subsea device 404 may be an air gun or other subsea device requiring a ruggedized source connector 420. The source connector 420 comprises a first plug end 422 and a second plug end 424 joined by a cable 426. The first plug end 422 and second plug end 424 may be the source connector 100 shown in FIG. 3. The first plug end 422 is adapted to mate with the receptacle 410 on the electrical source 402 and the second plug end 424 is adapted to mate with the receptacle 412 on the subsea device 404. In other embodiments the source connector 100 shown in FIGS. 2A and 3 is only used on one end of the source connector 420. For example, first plug end 422 may be any suitable connector type and the second plug end 424 may be the source connector 100 of the present invention.

With reference now to FIG. 4, a front view of a four pin configuration source connector 100 is provided. While the four pin configuration of source connector 100 is shown, it should also be understood that other configurations may be used when the source connector 100 is implemented with different device types. For example, some manufacturers or devices may only require a two pin configuration and other manufacturers or devices may require other proprietary pin configurations. The embodiment shown in FIG. 4 is a four pin configuration used by some manufacturers for some air gun devices. The face 144 of the source connector 100 is disposed within the front rim 142 of the connector 100. The collar 140 of the connector 100 provides support for the connector 100 when it is in a mated condition with a receptacle. The pins 146 may comprise a positive transducer connection 146A, a negative transducer connection 146C, a first solenoid connection 146B and a second solenoid connection 146D.

Figure 5:
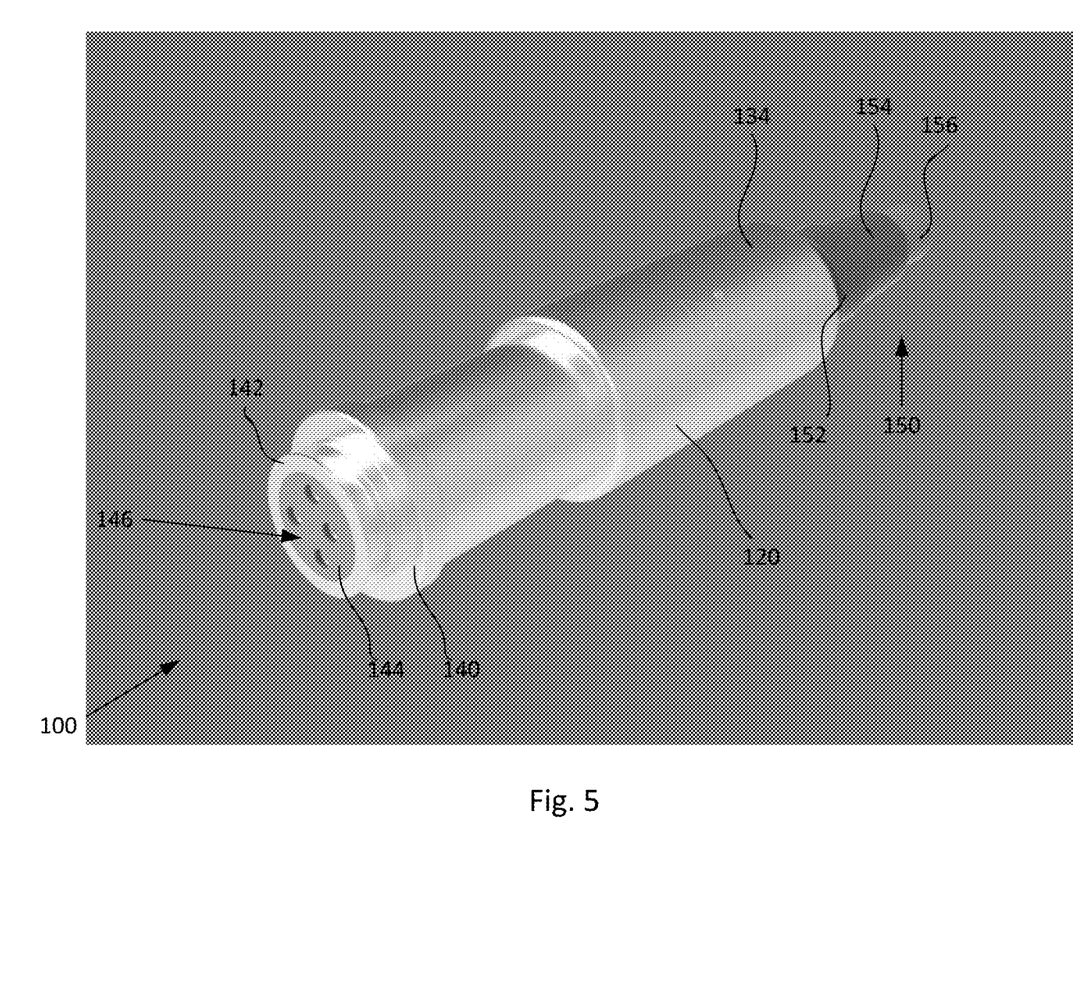
FIG. 5 provides a perspective view of a four-pin source connector according to the present invention.

With reference now to FIG. 5, a perspective view of the source connector 100 is provided. The connector body 120 of the source connector 100 surrounds the interior of the connector 100 where terminals on a receptacle may enter the connector 100 through pins 146 to operatively and/or electrically join with the cable 156. When the connector 100 is mated with a receptacle the face 144 of the connector 100 will abut the receptacle, and the collar 140 will provide additional support for the connector 100. The body 120 and shell 134 surround the overmold 152 of the overmold assembly 150. The tail 154 provides additional support to the overmold-to-cable transition to the cable 156.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A ruggedized source connector comprising:
a body having a front, a back, an interior and an exterior;
an overmold assembly disposed in part at the back and in the interior of the body;
a shell mechanically coupled to the body and disposed about the exterior of the back of the body and covering at least a portion of the overmold assembly, the shell adapted to prevent damage to the overmold assembly;
a set of pins disposed in the interior at the front of the body; and
a cable disposed within the overmold assembly and having a set of conductors electrically connected to the set of pins, the cable comprising a plurality of reinforcement layers anchored within the interior of the body, the anchored plurality of reinforcement layers adapted to transfer torsional and axial stress loads from the cable and the overmold to the body.

2. The source connector of claim 1 wherein the shell comprises a blast shield.

3. The source connector of claim 1 wherein the overmold assembly comprises a shell-to-overmold transition and a tapered tail adapted to provide strain relief to the cable.

4. The source connector of claim 1 wherein strain relief for the cable is provided by the plurality of reinforcement layers.

5. The source connector of claim 4 wherein the reinforcement layers comprise layers of aramid fiber reinforcement.

6. The source connector of claim 1 wherein the overmold assembly comprises an engineered polymer overmold.

7. The source connector of claim 1 wherein a set of o-rings are disposed at the front of the body and are adapted to provide a hermetic seal when the source connector is in a mated configuration.

8. The source connector of claim 1 wherein the shell is coupled with the body by a threaded portion.

9. The source connector of claim 1 wherein the plurality of reinforcement layers of the cable are anchored in a socket within the interior of the body by one of potting or a conical anchor insert.

10. The source connector of claim 9 wherein the potting is a high strength epoxy potting and the socket is a spelter socket.

11. The source connector of claim 1 wherein the set of pins are disposed in a retained insert at the front of the body.

12. A system for providing an electrical connection to a piece of subsea equipment requiring a strain and pressure-resistant connection, the system comprising:
- an electrical power source;
- the piece of subsea equipment comprising a set of receptacles;
- a ruggedized source connector cable having a first source connector and a second source connector, each of the first source connector and the second source connector comprising:
  - a body having a front, a back, an interior and an exterior;
  - an overmold assembly disposed in part at the back and in the interior of the body;
  - a shell mechanically coupled to the body and disposed about the exterior of the back of the body and covering at least a portion of the overmold assembly, the shell adapted to prevent damage to the overmold assembly;
  - a set of pins disposed in the interior at the front of the body; and
  - a cable disposed within the overmold assembly and having a set of conductors electrically connected to the set of pins, the cable comprising a plurality of reinforcement layers anchored within the interior of the body, the anchored plurality of reinforcement layers adapted to transfer torsional and axial stress loads from the cable and the overmold to the body;

wherein the piece of subsea equipment is connected to the electrical power source by the first source connector of the ruggedized source connector cable mated to a receptacle in the set of receptacles and the second source connector of the ruggedized source connector cable in an operative electrical connection with the electrical power source.

13. The system of claim 12 wherein the piece of subsea equipment is an air gun.

14. The system of claim 12 wherein the shell of the source connector comprises a blast shield.

15. The system of claim 12 wherein the overmold assembly of the source connector comprises a shell-to-overmold transition and a tapered tail adapted to provide strain relief to the cable.

16. The system of claim 1 wherein strain relief for the cable is provided by the plurality of reinforcement layers.

17. The system of claim 16 wherein the reinforcement layers comprise layers of aramid fiber reinforcement.

18. The system of claim 12 wherein the overmold assembly of the source connector comprises an engineered polymer overmold.

19. The system of claim 12 wherein a set of o-rings are disposed at the front of the body of the source connector and are adapted to provide a hermetic seal when the source connector is mated with the receptacle.

20. The system of claim 12 wherein the shell of the source connector is joined with the body by a threaded portion.

21. The system of claim 12 wherein the plurality of reinforcement layers of the cable are potted in a socket within the interior of the body by one of potting or a conical anchor insert.

22. The system of claim 21 wherein the potting is high strength epoxy potting and the socket is a spelter socket.

23. The system of claim 12 wherein the set of pins in the source connector are disposed in a retained insert at the front of the body.

* * * * *